T. J. Magruder.
Tug-Lug for Harness.
Nº 97,786.  Patented Dec. 14, 1869.

Witnesses:

Inventor:
T. J. Magruder
Per
Atty

United States Patent Office.

T. J. MAGRUDER, OF MARION, OHIO.

Letters Patent No. 97,786, dated December 14, 1869.

---

IMPROVED SHAFT-TUG LUG FOR HARNESS.

---

The Schedule referred to in these Letters Patent and making part of the same.

---

*To all whom it may concern:*

Be it known that I, T. J. MAGRUDER, of Marion, in the county of Marion, and State of Ohio, have invented a new and useful Improvement in Shaft-Tug Lugs for Harness; and I do hereby declare that the following is a full, clear, and exact description thereof, which will enable others skilled in the art to make and use the same, reference being had to the accompanying drawing, forming part of this specification.

This invention relates to improvements in the construction and application of shaft-tug lugs for harness, and consists in forming the said lugs with broad and long plates, properly curved, to suit the curve of the pad, and connecting the latter to the under side of the skirts, and to the pads, in a way to stiffen the skirt, and to hold the studs securely from breaking loose, the said lugs being made solid, with a screw-nut at the end, to confine the bearing-straps, or hollow, with female-screw threads, near the base, and bolts screwing into the said female threads to secure the bearing-straps, and to admit of readily applying or removing the straps, so that the harness may be adapted for use, either as single or double harness.

Similar letters of reference indicate corresponding parts.

*a* represents the plates to which the studs *b b'* are connected. These plates are made slightly oval in form, to suit the shape required for the skirts, and they are made long enough to stiffen and shape the said skirts to a considerable extent.

They are placed between the skirts and the pads *m*, and secured to the former by riveting, and they may be riveted or otherwise secured to the pads.

These lugs project through holes in the skirts, and support the bearing-straps *n*, upon which the shaft-tugs *o* are suspended.

Figure 1:
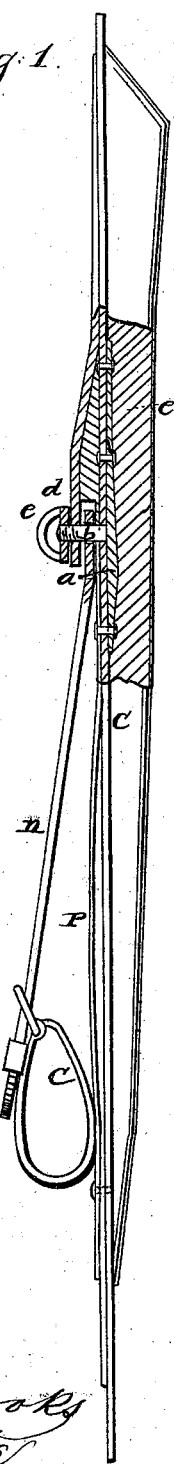
Figure 1 is a sectional elevation of a pad, showing my improved arrangement when a solid bolt is used.

In fig. 1, the lug *b* is represented as made solid, and provided with a male-screw thread at the end, whereon a nut, *d*, is screwed to secure the bearing-straps *n*.

These nuts are provided with yokes *e*, through which rods may be readily placed for turning them, for taking off or putting on the bearing-straps, in changing the harness for use as single or double harness, which may be readily done, the tug-loop strap *p* being provided, as shown in fig. 1, for supporting the tugs, when used as a double harness, when the bearing-straps are removed.

Figure 2:
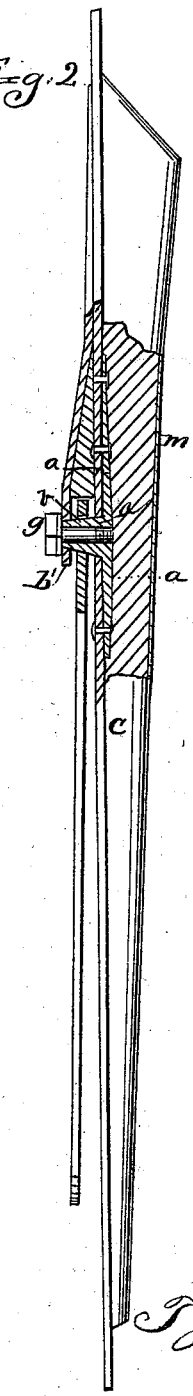
Figure 2 is a similar view, showing a hollow lug.

In fig. 2, the lug is represented as made hollow, with a female thread near the base, at *f*, and having a bolt, *g*, screwed therein to hold the bearing-strap. These lugs may be made in either form, larger at the base, to insure sufficient strength.

Having thus described my invention,

I claim as new, and desire to secure by Letters Patent—

A harness-tug lug, provided with the plate *a*, and secured to the skirts and pads as described, when the lug is either made hollow, and provided with female-screw thread, and an engaging-bolt, *g*, or solid, with removable nut *d*, all substantially as specified.

T. J. MAGRUDER.

Witnesses:
M. CROWNWETT,
JOHN MOORE.